United States Patent
Pei

(10) Patent No.: US 12,433,544 B2
(45) Date of Patent: Oct. 7, 2025

(54) METHODS AND SYSTEMS FOR ENHANCED POSTURE SENSING

(71) Applicant: Pacesetter, Inc., Sylmar, CA (US)

(72) Inventor: Xing Pei, Ventura, CA (US)

(73) Assignee: Pacesetter, Inc., Sylmar (CA)

( * ) Notice: Subject to any disclaimer, the term of this patent is extended or adjusted under 35 U.S.C. 154(b) by 423 days.

(21) Appl. No.: 17/660,777

(22) Filed: Apr. 26, 2022

(65) Prior Publication Data

US 2022/0386963 A1 Dec. 8, 2022

Related U.S. Application Data

(60) Provisional application No. 63/195,810, filed on Jun. 2, 2021.

(51) Int. Cl.
| | |
|---|---|
| *A61B 5/00* | (2006.01) |
| *A61B 5/11* | (2006.01) |
| *A61B 5/352* | (2021.01) |
| *A61B 5/355* | (2021.01) |

(52) U.S. Cl.
CPC .......... *A61B 5/725* (2013.01); *A61B 5/1116* (2013.01); *A61B 5/352* (2021.01); *A61B 5/355* (2021.01); *A61B 5/4836* (2013.01); *A61B 5/686* (2013.01); *A61B 2560/02* (2013.01)

(58) Field of Classification Search
CPC ....... A61B 5/725; A61B 5/1116; A61B 5/352; A61B 5/355; A61B 5/4836; A61B 5/686; A61B 2560/02; A61B 5/02–5/0295; A61N 1/36535

See application file for complete search history.

(56) References Cited

U.S. PATENT DOCUMENTS

| | | | |
|---|---|---|---|
| 7,376,458 B2* | 5/2008 | Palreddy ................ | A61B 5/35 600/509 |
| 7,477,935 B2* | 1/2009 | Palreddy ............. | A61N 1/3956 600/509 |
| 11,207,532 B2* | 12/2021 | Eddy .................... | A61N 1/3925 |
| 2017/0156617 A1* | 6/2017 | Allavatam ............ | A61B 5/349 |
| 2018/0035898 A1* | 2/2018 | Gunderson ............ | A61B 5/287 |
| 2018/0185660 A1* | 7/2018 | Eddy .................... | A61N 1/3704 |

* cited by examiner

Primary Examiner — Jonathan T Kuo
(74) Attorney, Agent, or Firm — Dean D. Small; The Small Patent Law Group, LLC

(57) ABSTRACT

A computer implemented method is provided that includes, under control of one or more processors of an implantable medical device (IMD), obtaining motion data indicative of a first posture, and determining a first sense setting of the IMD based on the first posture. The method also includes obtaining cardiac activity (CA) signals for a series of beats while applying the first sense setting, obtaining a characteristic of interest (COI) from the CA signals for the series of beats, and calculating a statistical indicator from the COI over the series of beats based on the COI from the CA signals. The method also includes deriving a second sense setting based on the first sense setting and the statistical indicator of the COI.

20 Claims, 6 Drawing Sheets

METHODS AND SYSTEMS FOR ENHANCED POSTURE SENSING

RELATED APPLICATION DATA

The present application claims priority to U.S. Provisional Application No. 63/195,810, titled "METHODS AND SYSTEMS FOR ENHANCED POSTURE SENSING," filed Jun. 2, 2021, the complete subject matter of which is expressly incorporated herein by reference in its entirety.

BACKGROUND

Embodiments herein generally relate to methods and systems for enhancing posture sensing for an implantable medical device.

Implantable medical devices (IMDs) are well known in the art. IMDs may take the form of implantable defibrillators or cardioverters which treat accelerated rhythms of the heart such as fibrillation. IMDs may also take the form of implantable pacemakers which maintains the heart rate above a prescribed limit, such as, for example, to treat a bradycardia. IMDs may also incorporate more than one of a pacemaker, a cardioverter, and a defibrillator. Defibrillators may include "shock only" functionality or, in addition to shocking functionality, a defibrillator may be capable of providing cardiac resynchronization therapy (CRT) functionality. IMDs may also take the form of implantable cardio-monitor which monitor the heart rhythm above a prescribed limit, such as, for example, to diagnostic a bradycardia arrhythmias.

IMDs are coupled to one or more electrodes that may or may not include leads, to sense one or more types of information, generate various types of diagnostics, and to deliver various types of treatments and/or therapies, for applicable device types. IMDs typically include various sensing circuitry and logic that monitor a heart for cardiac activity signals, and analyze the cardiac activity signals to identify normal sinus rhythm, arrhythmias, physiological status of the patient, and the like. IMDs may be configured to generate alerts and/or deliver therapies based on the identification of cardiac events (e.g., arrythmias), physiological status of the patient, and the like. However, IMDs may incorrectly interpret the cardiac activity signals and declare a false cardiac event and/or physiological status of the patient due to oversensing or undersensing one or more characteristics of interest of the cardiac activity signals. For example, adequate detection of atrial contraction and ventricular contraction (e.g., P-waves, the QRS complex, R-wave amplitude, and the like) is important for reliable cardiac event (e.g., arrythmia) detection and/or treatment delivery. Conventionally, a clinician may adjust certain programmable parameters of the sensing circuitry during implantation or revision of the IMD to change the fixed sensitivity of the sensing circuit in order to ensure more accurate detection of one or more characteristics of interest of the cardiac activity signals. One consideration for achieving adequate detection of the cardiac activity signals is placement of the IMD in an optimal anatomical orientation and/or location. However, it may not be possible to always achieve the optimal anatomical location and/or orientation during implantation. Furthermore, other factors such as patient posture and a respiration cycle may impact the ability of the IMD to correctly detect and interpret the cardiac activity signals post-implantation.

In particular, an ECG signal amplitude varies, as the contact to the tissue varies associated with the body position change (posture change) as well as resulting pressure of the device sensing electrode. The sensing instability may cause false detection of a rhythm and/or miss the detection of an arrythmia.

SUMMARY

In accordance with embodiments herein, a computer implemented method is provided that includes, under control of one or more processors of an implantable medical device (IMD), obtaining motion data indicative of a first posture, and determining a first sense setting of the IMD based on the first posture. The method also includes obtaining cardiac activity (CA) signals for a series of beats while applying the first sense setting, obtaining a characteristic of interest (COI) from the CA signals for the series of beats, and calculating a statistical indicator from the COI over the series of beats based on the COI from the CA signals. The method also includes deriving a second sense setting based on the first sense setting and the statistical indicator of the COI.

Optionally, to obtain the COI from the CA signal for the series of beats includes determining a first threshold and a second threshold, and measuring morphology and amplitude of the CA signals based on the first threshold and second threshold. In one aspect, the method further includes identifying R-waves based on the first amplitude threshold, and identifying T-waves based on the second amplitude threshold. In another aspect, to obtain the statistical indicator of the COI includes calculating at least one of an amplitude minimum, an amplitude maximum, a distribution of amplitudes, or a deviation related to an amplitude. In one example, the first sense setting is at least one of gain, dynamic range, threshold, or filtering. In another example to determine the first sense setting of the IMD based on the first posture includes determining if a threshold amount of series of beats has occurred, and determining the first sense setting based on the COI from the CA signals or the statistical indicator responsive to reaching the threshold amount.

Optionally, the one or more processors obtain the CA signals for the series of beats while applying the first sense setting responsive to a first event. In one aspect, the first event is one of a determined time period or a detection of a change in posture. In another aspect, to determine a first sense setting includes obtaining cardiac activity (CA) signals for a series of beats before applying the first sense setting, obtaining a characteristic of interest (COI) from the CA signals for the series of beats obtained before applying the first setting, calculating a statistical indicator of the series of beats obtained before applying the first setting based on the COI from the CA signals, and determining the first setting based on the statistical indicator of the series of beats obtained before applying the first setting.

In one or more embodiments, a system is provided that includes one or more processors, and a memory coupled to the one or more processors. The memory stores program instructions, wherein the program instructions are executable by the one or more processors to obtain motion data indicative of a first posture, and determine a first sense setting of the IMD based on the first posture. The one or more processors are also configured to obtain cardiac activity (CA) signals for a series of beats while applying the first sense setting, obtain a characteristic of interest (COI) from the CA signals for the series of beats, calculate a statistical indicator from the COI over the series of beats based on the COI from the CA signals, and derive a second sense setting based on the first sense setting and the statistical indicator of the COI.

Optionally, to obtain the COI from the CA signal for the series of beats includes determining a first threshold and a second threshold, and measuring morphology and amplitude of the CA signals based on the first threshold and second threshold. In one aspect, the one or more processors are configured to identify R-waves based on the first amplitude threshold, and identify T-waves based on the second amplitude threshold. In another aspect, to obtain the statistical indicator of the COI includes calculating at least one of an amplitude minimum, an amplitude maximum, a distribution of amplitudes, or a deviation related to an amplitude. In one example, the first sense setting is at least one of gain, dynamic range, threshold, or filtering. In another example, to determine the first sense setting of the IMD based on the first posture includes determining if a threshold amount of series of beats has occurred, and determining the first sense setting based on the COI from the CA signals or the statistical indicator responsive to reaching the threshold amount. In one embodiment, the one or more processors obtain the CA signals for the series of beats while applying the first sense setting responsive to a first event.

In one or more embodiments, a system is provided that includes one or more processors, and a memory coupled to the one or more processors, wherein the memory stores program instructions, and the program instructions are executable by the one or more processors to obtain motion data indicative of a first posture. The one or more processors are also configured to determine a first sense setting of the IMD based on the first posture, obtain motion data indicative of a second posture, and determine a first sense setting of the IMD based on the second posture. The one or more processors are also configured to obtain cardiac activity (CA) signals for a series of beats while applying the first sense setting of the first posture, obtain a characteristic of interest (COI) from the CA signals for the series of beats obtained while applying the first sense setting of the first posture, and calculate a statistical indicator from the COI over the series of beats obtained while applying the first sense setting of the first posture based on the COI from the CA signals. The one or more processors are also configured to derive a second sense setting for the first posture based on the first sense setting and the statistical indicator of the COI obtained while applying the first sense setting of the first posture, detect a change in posture from the first posture to the second posture, and responsive to the change in posture from the first posture to the second posture applying the first sense setting for the second posture.

Optionally, the program instructions are executable by the one or more processors to also obtain cardiac activity (CA) signals for a series of beats while applying the first sense setting of the second posture, obtain a characteristic of interest (COI) from the CA signals for the series of beats obtained while applying the first sense setting of the second posture, calculate a statistical indicator from the COI over the series of beats based on the COI from the CA signals obtained while applying the first sense setting of the second posture, and derive a second sense setting for the second posture based on the first sense setting and the statistical indicator of the COI obtained while applying the first sense setting of the second posture. In one aspect, to obtain the COI from the CA signals for the series of beats obtained while applying the first sense setting of the first posture includes determining a first threshold and a second threshold and measuring morphology and amplitude of the CA signals for the series of beats obtained while applying the first sense setting of the first posture based on the first threshold and second threshold. In another aspect, the one or more processors are configured to identify R-waves based on the first amplitude threshold, and identify T-waves based on the second amplitude threshold.

DETAILED DESCRIPTION

Figure 1:
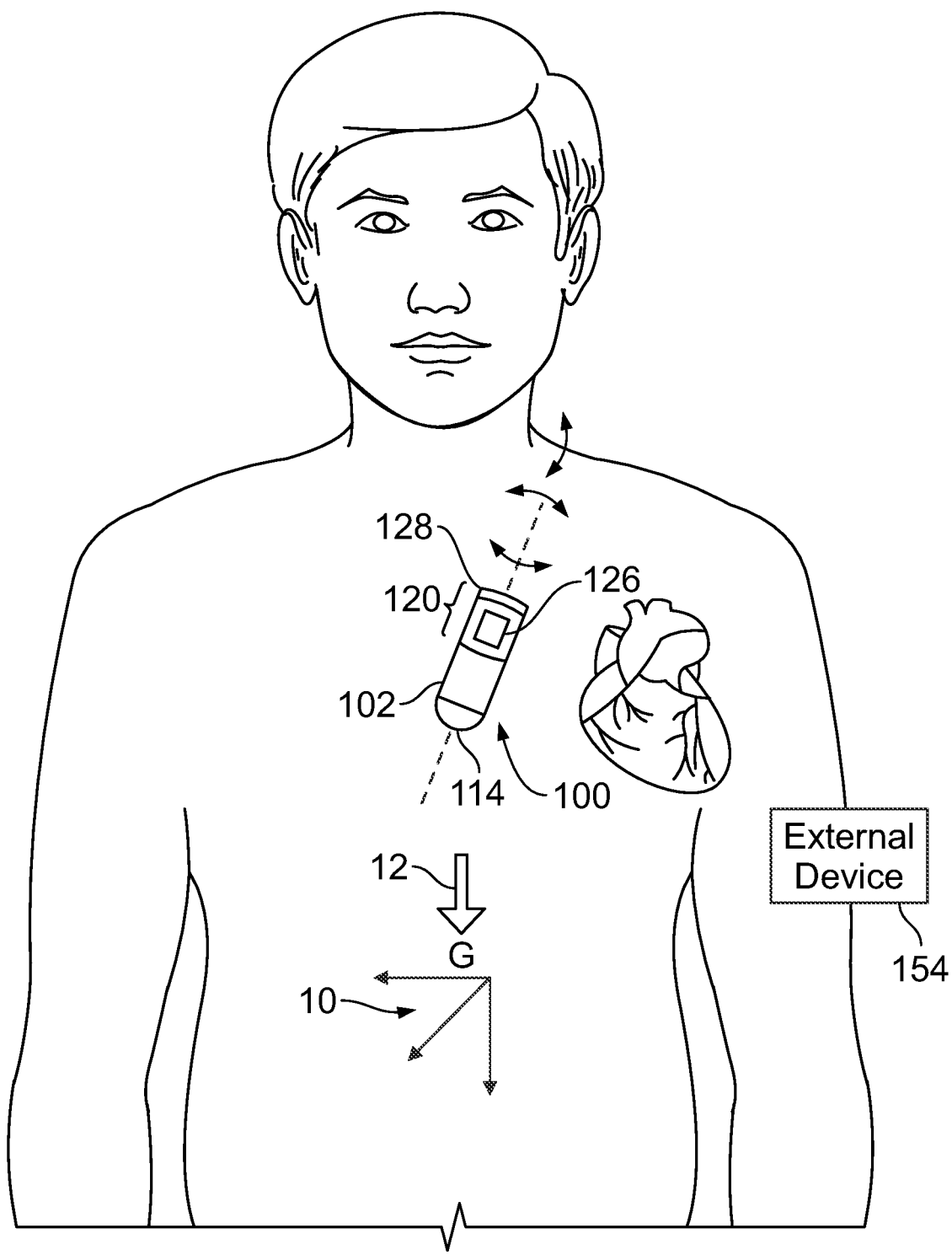
FIG. 1 illustrates a graphical representation of a heart with an implantable medical device (IMD) for reducing false declarations of cardiac events due to undersensing or oversensing of R-waves in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The methods described herein may employ structures or aspects of various embodiments (e.g., systems and/or methods) discussed herein. In various embodiments, certain operations may be omitted or added, certain operations may be combined, certain operations may be performed simultaneously, certain operations may be performed concurrently, certain operations may be split into multiple operations, certain operations may be performed in a different order, or certain operations or series of operations may be re-performed in an iterative fashion. It should be noted that, other methods may be used, in accordance with an embodiment herein. Further, wherein indicated, the methods may be fully or partially implemented by one or more processors of one or more devices or systems. While the operations of some methods may be described as performed by the processor(s) of one device, additionally, some or all of such operations may be performed by the processor(s) of another device described herein.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

All references, including publications, patent applications and patents, cited herein are hereby incorporated by reference to the same extent as if each reference were individually and specifically indicated to be incorporated by reference and were set forth in its entirety herein.

Terms

The terms "posture" and "patient posture" refer to postural states and/or activity levels of a patient including supine, laying on a right side, laying on a left side, sitting, standing, isometric arm exercises (e.g., pushing, pulling, and the like), ballottement, chest thump, device pressure (e.g., top, mid, and base), arm flap, hand shake, and the like.

The term "motion data" as used herein shall refer to all data, information, signals, etc. related to the motion of a user. The motion data in one example is obtained from a physiological sensor, such as an accelerometer, 3-D accelerometer, or the like. Motion data can include accelerations, decelerations, movements, etc. in a single axis, or in multiple axes. Motion data can also include changes in postures, or no change in posture where no motion is detected. In one example, position data, information, etc. can be considered motion data.

The term "interval" as used herein shall refer to a period of time having a begging and an end. An interval may be expressed in terms of time, such as second, minutes, hours, etc. Alternatively, an interval may be expressed in connection with a certain activity being accomplished. For example, when a user of an IMD first has the IMD implanted, goes to a clinician for calibration and providing initial settings etc. the corresponding interval can be the time during which measurements are taken to determine the first sense setting. For example, for one patient, the first interval for a first posture may last ten minutes to obtain sufficient data to determine first sensing settings, whereas for a second patient in the first posture may require a first interval of twenty minutes to obtain sufficient data determine the first sensing settings. The first interval begins when the first CA signal is obtained, and the first interval ends upon providing the first sense setting. Then, for a second posture, a new first interval can begin with CA signals being obtained for the second posture. Meanwhile, subsequent intervals, including second intervals, third intervals, etc. occur after the sense settings are determined, and utilized by the IMD. This may occur while still in the environment of the clinician, but more likely outside the environment of the clinician.

The term "event" as used herein refers to an action that occurs. For example, the lapsing of a determined time period can be an event. Alternatively, an action occurring such as a change in posture, a detection of an arrythmia, etc. can be considered an event.

The term "activity level" as used herein refers to types of activity currently experienced by a patient, including stationary state, rest state, exercise state, walking state, and the like.

The terms "cardiac activity signal", "cardiac activity signals", "CA signal" and "CA signals" (collectively "CA signals") are used interchangeably throughout to refer to an analog or digital electrical signal recorded by two or more electrodes positioned subcutaneous or cutaneous, where the electrical signals are indicative of cardiac electrical activity. The cardiac activity may be normal/healthy or abnormal/arrhythmic. Non-limiting examples of CA signals include ECG signals collected by cutaneous electrodes, and EGM signals collected by subcutaneous electrodes and/or by electrodes positioned within or proximate to the heart wall and/or chambers of the heart.

The term "characteristic of interest and "COI" as used interchangeably herein as used herein in association with CA signals refer to any and all properties, parameters, etc. of a CA signal. Characteristics of interest of CA signals include the morphology of the CA signal, CA signal amplitude, CA signal intervals, CA signal R-wave amplitudes, CA signal T-wave amplitudes, CA signal noise such as local maximum or peaks in the CA signal morphology, CA signal rate, etc.

The term "statistical indicator" as used herein refers to any representation of a mathematical characteristic associated with a CA signal. The mathematic characteristics in one example are calculated, determined, etc. by utilization of a mathematical formula, mathematical model, lookup table, algorithm, AI algorithm, etc. Example statistical indicators include minimums, maximums, averages, medians, distributions, deviations, etc.

The terms "artificial intelligence", "machine learning" and "self-learning" are used interchangeably throughout and shall mean an artificial intelligence algorithm that learns from various automatic or manual inputs, such as features of interest, prior device classified arrhythmias, observations and/or data. The machine learning algorithm is adjusted over multiple iterations based on the features of interest, posture, CA signals, COI of CA signals, sense settings, prior device classified arrhythmias, observations and/or data. For example, the machine learning algorithm is adjusted by supervised learning, unsupervised learning, and/or reinforcement learning. Non-limiting examples of machine learning algorithms are a convolutional neural network, gradient boosting random forest, decision tree, K-means, deep learning, artificial neural network, and/or the like. For example, an artificial intelligence algorithm, learning algorithm, etc. can be utilized to continuously update sense settings associated with a sensed posture. During a first interval, a first posture is determined by a 3D accelerometer. During this first time interval, COIs of CA signals associated with a first posture are also determined and recorded, and can also be utilized to determine statistical indicators of the CA signals. COIs of CA signals can include amplitude, morphology, noise, etc. Statistical indicators include maximums, minimums, averages, distributions, deviations, etc. Then, during subsequent time intervals, the posture of the user can be determined by using the sensor, and the settings associated with the posture and sensor. From time to time, the COIs of the CA signals and statistical indicators can then be reviewed to determine changes in the COIs of the CA signals and statistical indicators at the first posture compared to the first interval. Then based on these changes, the sense settings can be updated based on the sensed posture and COIs of the CA signals and the statistical indicators. Because the sense settings are updated based on COIs of CA signals during operation without an individual recalibrating the system, the algorithm is considered self-learning, machine learning or an AI algorithm.

The term "real-time" refers to a time frame contemporaneous with normal or abnormal episode occurrences. For example, a real-time process or operation would occur during or immediately after (e.g., within minutes or seconds after) a cardiac event, a series of cardiac events, an arrhythmia episode, and the like.

The term "time dependent", as used herein relates to CA signals including any and all changes related, caused by, as a result of, a determined time period. The determined time period is a set amount of time, that in example embodiment could be one minute, five minutes, ten minutes, one hour, etc. In particular, a set amount of time is provided, and regardless of activities during that set amount of time, the set amount of time concludes.

The term "feedback dependent", as used herein related to CA signals including any and all changes as a result of an obtained data, information, signal, etc. The obtained data, information, signal, etc. can be obtained from an accelerometer, monitor, detector, or the like. In one example, changes in posture, including from standing to sitting, standing to laying prone, sitting to laying prone, or the like result in obtaining the feedback dependent CA signals. In other examples, changes as a result of a medication, as a result of a patient condition, or the like may provide the data, information, signal, etc. obtained to provide the feedback dependent CA signal.

The term "obtains" and "obtaining", as used in connection with data, signals, information, and the like, include at least one of i) accessing memory of an external device or remote server where the data, signals, information, etc. are stored, ii) receiving the data, signals, information, etc. over a wireless communications link between the IMD and a local external device, and/or iii) receiving the data, signals, information, etc. at a remote server over a network connection. The obtaining operation, when from the perspective of an IMD, may include sensing new signals in real time, and/or accessing memory to read stored data, signals, information, etc. from memory within the IMD. The obtaining operation, when from the perspective of a local external device, includes receiving the data, signals, information, etc. at a transceiver of the local external device where the data, signals, information, etc. are transmitted from an IMD and/or a remote server. The obtaining operation may be from the perspective of a remote server, such as when receiving the data, signals, information, etc. at a network interface from a local external device and/or directly from an IMD. The remote server may also obtain the data, signals, information, etc. from local memory and/or from other memory, such as within a cloud storage environment and/or from the memory of a workstation or clinician external programmer.

Embodiments may be implemented in connection with one or more implantable medical devices (IMDs). Non-limiting examples of IMDs include one or more of neurostimulator devices, implantable cardiac monitoring and/or therapy devices. For example, the IMD may represent a cardiac monitoring device, pacemaker, cardioverter, cardiac rhythm management device, defibrillator, neurostimulator, leadless monitoring device, leadless pacemaker, an external shocking device (e.g., an external wearable defibrillator), and the like. For example, the IMD may be a subcutaneous IMD that includes one or more structural and/or functional aspects of the device(s) described in U.S. application Ser. No. 15/973,195, titled "Subcutaneous Implantation Medical Device With Multiple Parasternal-Anterior Electrodes" and filed May 7, 2018; U.S. application Ser. No. 15/973,219, titled "Implantable Medical Systems And Methods Including Pulse Generators And Leads" filed May 7, 2018; U.S. application Ser. No. 15/973,249, titled "Single Site Implantation Methods For Medical Devices Having Multiple Leads", filed May 7, 2018, which are hereby incorporated by reference in their entireties. Additionally or alternatively, the IMD may include one or more structural and/or functional aspects of the device(s) described in U.S. Pat. No. 9,333,351 "Neurostimulation Method and System to Treat Apnea" and U.S. Pat. No. 9,044,710 "System and Methods for Providing A Distributed Virtual Stimulation Cathode for Use with an Implantable Neurostimulation System", which are hereby incorporated by reference. Further, one or more combinations of IMDs may be utilized from the above incorporated patents and applications in accordance with embodiments herein.

Additionally or alternatively, the IMD may include one or more structural and/or functional aspects of the device(s) described in U.S. Pat. No. 9,216,285 "Leadless Implantable Medical Device Having Removable and Fixed Components" and U.S. Pat. No. 8,831,747 "Leadless Neurostimulation Device and Method Including the Same", which are hereby incorporated by reference. Additionally or alternatively, the IMD may include one or more structural and/or functional aspects of the device(s) described in U.S. Pat. No. 8,391,980 "Method and System for Identifying a Potential Lead Failure in an Implantable Medical Device", U.S. Pat. No. 9,232,485 "System and Method for Selectively Communicating with an Implantable Medical Device", EP Application No. 0070404 "Defibrillator" and, U.S. Pat. No. 5,334,045 "Universal Cable Connector for Temporarily Connecting Implantable Leads and Implantable Medical Devices with a Non-Implantable System Analyzer", U.S. patent application Ser. No. 15/973,126, titled "Method And System For Second Pass Confirmation Of Detected Cardiac Arrhythmic Patterns"; U.S. patent application Ser. No. 15/973,351, Titled "Method And System To Detect R-Waves In Cardiac Arrhythmic Patterns"; U.S. patent application Ser. No. 15/973,307, titled "Method And System To Detect Post Ventricular Contractions In Cardiac Arrhythmic Patterns"; and U.S. patent application Ser. No. 16/399,813, titled "Method And System To Detect Noise In Cardiac Arrhythmic Patterns" which are hereby incorporated by reference.

Additionally or alternatively, the IMD may be a leadless cardiac monitor (ICM) that includes one or more structural and/or functional aspects of the device(s) described in U.S. patent application Ser. No. 15/084,373, filed Mar. 29, 2016, entitled, "Method and System to Discriminate Rhythm Patterns in Cardiac Activity"; U.S. patent application Ser. No. 15/973,126, titled "Method And System For Second Pass Confirmation Of Detected Cardiac Arrhythmic Patterns"; U.S. patent application Ser. No. 15/973,351, titled "Method And System To Detect R-Waves In Cardiac Arrhythmic Patterns"; U.S. patent application Ser. No. 15/973,307, titled "Method And System To Detect Post Ventricular Contractions In Cardiac Arrhythmic Patterns"; and U.S. patent application Ser. No. 16/399,813, titled "Method And System To Detect Noise In Cardiac Arrhythmic Patterns", which are expressly incorporated herein by reference.

In accordance with embodiments herein, a self-learning (e.g., machine learning) posture augmented sensing setting (such as gains, dynamic range, threshold, filtering) algorithm is provided. After the self-learning phase, the IMD adjusts its sensing setting to optimize the sensing experience, and to improve accuracy of arrhythmia detection. In particular, during the self-learning phase, the system starts in a default programmed setting. The device may be time-dependent, obtaining data, information, signals, etc. periodically (e.g. minutes or hours), or may be feedback dependent, obtaining data, information, signals, etc. after an event, reading, detection, etc. (e.g. after a posture change) The device in one example obtains an ECG signal to determine R-wave amplitude and T-wave amplitude. Statistical indicators such as amplitude minimum, maximum, average, median, distribution, deviation for signals, or the like are determined. In addition, a noise floor is also determined. After collecting sufficient data, the device determines a sensing setting for the corresponding postures. The device then applies the learned sensing setting for a corresponding posture (e.g. sitting, laying down, supine, standing, activity level, etc.). Meanwhile, the device periodically (e.g. time-dependent), or as a result of feedback such as posture change, medication, medical condition, etc. (e.g. feedback dependent), obtains the ECG signal and determines the R-wave amplitude, and T-wave amplitude. The device then updates the amplitude minimum, maximum, average, median, distribution, deviation for signals, and the like, and the noise floor. The device also updates the sensing setting for the corresponding postures accordingly.

FIG. 1 illustrates an implantable medical device (IMD) 100 intended for subcutaneous implantation at a site near the heart. The IMD 100 includes a pair of spaced-apart sense electrodes 114, 126 positioned with respect to a housing 102. The sense electrodes 114, 126 provide for detection of far field electrogram signals. Numerous configurations of electrode arrangements are possible. For example, the electrode 114 may be located on a distal end of the IMD 100, while the electrode 126 is located on a proximal side of the IMD 100. Additionally or alternatively, electrodes 126 may be located on opposite sides of the IMD 100, opposite ends or elsewhere. The distal electrode 114 may be formed as part of the housing 102, for example, by coating all but a portion of the housing with a nonconductive material such that the uncoated portion forms the electrode 114. In this case, the electrode 126 may be electrically isolated from the housing 102 electrode by placing it on a component separate from the housing 102, such as the header 120. Optionally, the header 120 may be formed as an integral portion of the housing 102. The header 120 includes an antenna 128 and the electrode 126. The antenna 128 is configured to wirelessly communicate with an external device 154 in accordance with one or more predetermined wireless protocols (e.g., Bluetooth, Bluetooth low energy, Wi-Fi, etc.).

The housing 102 includes various other components such as: sense electronics for receiving signals from the electrodes, a microprocessor for analyzing the far field CA signals, including assessing the presence of R-waves in cardiac beats occurring while the IMD is in different IMD locations relative to gravitational force, a loop memory for temporary storage of CA data, a device memory for long-term storage of CA data, sensors for detecting patient activity, including an accelerometer for detecting acceleration signatures indicative of heart sound, and a battery for powering components.

In at least some embodiments, the IMD 100 is configured to be placed subcutaneously utilizing a minimally invasive approach. Subcutaneous electrodes are provided on the housing 102 to simplify the implant procedure and eliminate a need for a transvenous lead system. The sensing electrodes may be located on opposite sides of the device and designed to provide robust episode detection through consistent contact at a sensor-tissue interface. The IMD 100 may be configured to be activated by the patient or automatically activated, in connection with recording subcutaneous ECG signals.

The IMD 100 senses far field, subcutaneous CA signals, processes the CA signals to detect arrhythmias and if an arrhythmia is detected, automatically records the CA signals in memory for subsequent transmission to an external device 154.

The IMD 100 is implanted in a position and orientation such that, when the patient stands, the IMD 100 is located at a reference position and orientation with respect to a global coordinate system 10 that is defined relative to a gravitational direction 12. For example, the gravitational direction 12 is along the Z-axis while the X-axis is between the left and right arms.

As explained herein, the IMD 100 includes electrodes that collect cardiac activity (CA) signals in connection with multiple cardiac beats and in connection with different IMD locations (e.g., different positions and/or different orientations). The IMD may change location within a subcutaneous pocket relative to an initial implant position through translation and/or rotation, such as i) moving up and down (elevating/heaving) within the subcutaneous pocket; ii) moving left and right (strafing/swaying); iii) moving forward and backward (walking/surging); iv) swiveling left and right (yawing); v) tilting forward and backward (pitching); and pivoting side to side (rolling). The IMD 100 also includes one or more sensors to collect device location information indicative of movement of the IMD 100 along one or more degrees of freedom, namely translational motion along X, Y, and Z directions, and/or rotationally motion along pitch, yaw and/or roll directions.

The IMD 100 also includes one or more sensors to collect acceleration signatures that are indicative of heart sounds produced at different points in a cardiac cycle.

Figure 2:
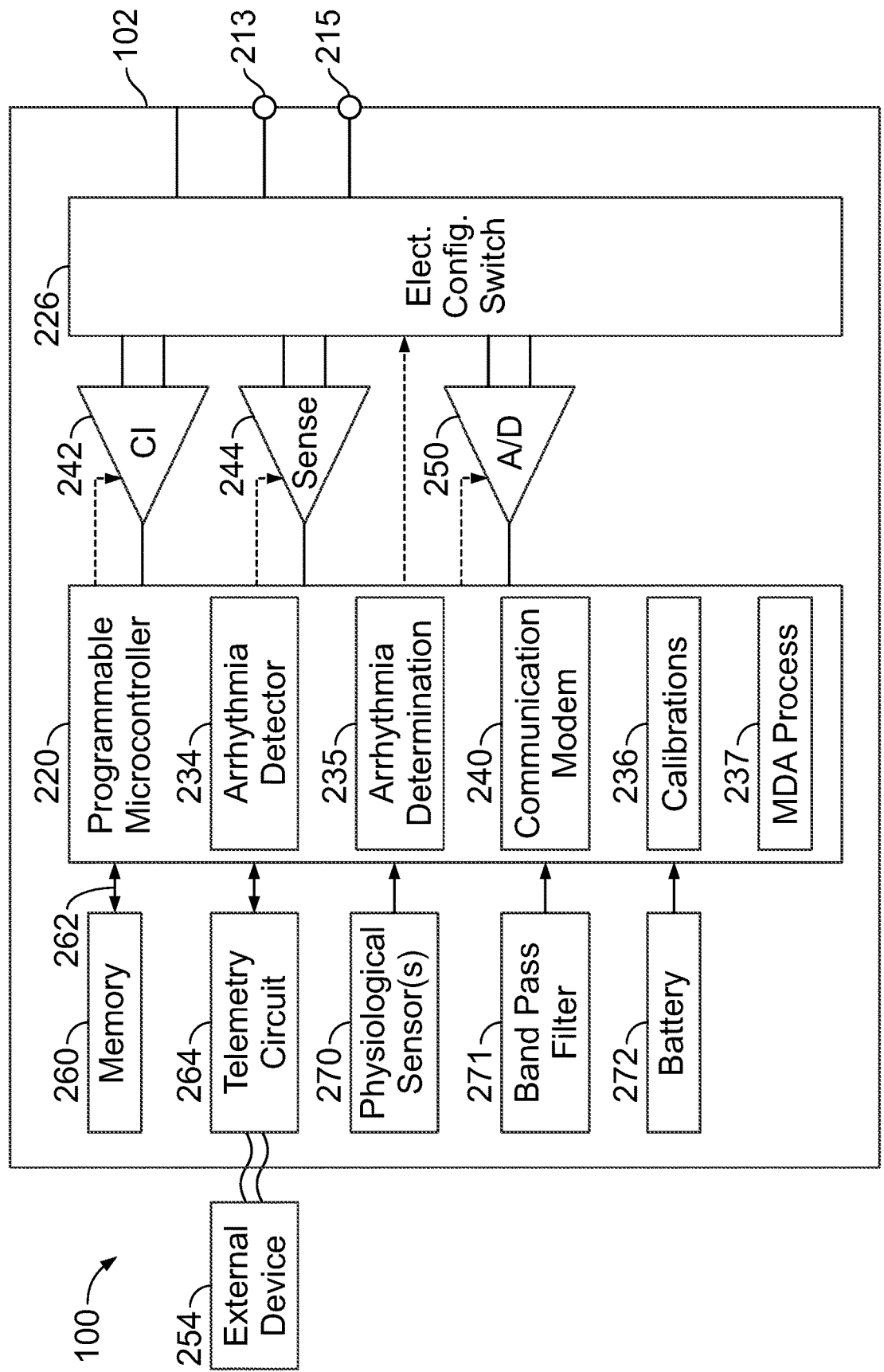
FIG. 2 illustrates a block diagram of an IMD formed in accordance with embodiments herein.

FIG. 2 shows an example block diagram of the IMD 100 formed in accordance with embodiments herein. The IMD 100 may be implemented to monitor ventricular activity alone, or both ventricular and atrial activity through sensing circuit. The IMD 100 has a housing 102 to hold the electronic/computing components. The housing 102 (which is often referred to as the "can," "case," "encasing," or "case electrode") may be programmably selected to act as an electrode for certain sensing modes. Housing 102 further includes a connector (not shown) with at least one terminal 213 and optionally additional terminals 215. The terminals 213, 215 may be coupled to sensing electrodes that are provided upon or immediately adjacent the housing 102. Optionally, more than two terminals 213, 215 may be provided in order to support more than two sensing electrodes, such as for a bipolar sensing scheme that uses the housing 102 as a reference electrode. Additionally or alternatively, the terminals 213, 215 may be connected to one or more leads having one or more electrodes provided thereon, where the electrodes are located in various locations about the heart. The type and location of each electrode may vary.

The IMD includes a programmable microcontroller 220 that controls various operations of the IMD 100, including cardiac monitoring. Microcontroller 220 includes a microprocessor (or equivalent control circuitry), RAM and/or ROM memory, logic and timing circuitry, state machine circuitry, and I/O circuitry. Microcontroller 220 includes an arrhythmia detector 234 that is configured to analyze the far field cardiac activity signals to identify the existence of an arrhythmia. The microcontroller 220 also includes arrhythmia determination circuitry 235 for analyzing the CA signals to assess a presence or absence of R-waves within the cardiac beats from a first segment of the CA signals, and detect an arrythmia based on the presence or absence of one or more R-waves from the cardiac beats within a second segment of the CA signals.

The microcontroller 220 also includes a motion data analysis (MDA) process 237 configured to analyze motion data to determine the posture of a user, and vary settings for sensing CA signals. The MDA process 237 is configured to implement one or more of the operations discussed herein. The MDA process 237 obtains CA signals, at the electrodes of the IMD 100, in connection with multiple cardiac beats and, in connection with the CA signals, obtains motion data indicative of one or more of a patient posture. The motion data can be obtained at one or more physiological sensors 170 (e.g., an accelerometer) and/or via a cardiac impedance (CI) sensing circuit 242 of the IMD 100 generated during the cardiac beats. Based on the analyzing operation, the MDA process 237 automatically adjusts the CA sensing settings utilized by the IMD 100 to detect CA morphology, including R-waves, and T-waves in subsequent CA signals. In example embodiments, the MDA process 237 can include algorithms, self-learning algorithms, machine learning, artificial intelligence, mathematical models, mathematical functions, etc. Based on the adjusted CA sensing settings, the arrythmia determination circuitry 235 detects an arrythmia based on the morphology of the CA signals.

The settings of the sensing circuit 244 can continuously adjusted in real time and varied by the microcontroller 220 based on the changes in posture, and when in use. The MDA process 237 modifies the settings to at least reduce false arrythmia detection due to undersensing or oversensing R-waves on at least one of i) beat by beat, or ii) for ensembles of beats. For detection for ensembles of beats, a monitoring window (e.g., 10 s-30 s) may be implemented to ensure the posture is stable over a given ensemble of beats (e.g., a moving average over the monitoring window). For example, a patient may change posture from a standing posture to a supine posture in 1 second, but changes in R-waves resulting from the change in posture from the standing posture to the supine posture may take additional time (e.g., 3-4 seconds).

The microcontroller 220 may also include calibration circuitry 236 that obtains calibration acceleration signatures at an accelerometer, or physiological sensor 270 that is indicative of motion data in connection with at least one of a patient posture or a respiration cycle of a patient. For example, the postures may include supine, laying on a right side, laying on a left side, positions resulting from increased activity level, or the like. In one example, the acceleration signatures are indicative of motion data generated in connection with first and second postures of a patient. After the calibration procedure, the calibration circuitry 236 utilizes the calibration acceleration signatures to determine an axis of the accelerometer associated with a current posture. The confirmation acceleration signatures are obtained along the axis of the accelerometer in connection with obtaining motion data indicative of a posture.

Although not shown, the microcontroller 220 may further include other dedicated circuitry and/or firmware/software components that assist in monitoring various conditions of the patient's heart and managing pacing therapies.

A switch 226 is optionally provided to allow selection of different electrode configurations under the control of the microcontroller 220. The electrode configuration switch 226 may include multiple switches for connecting the desired electrodes to the appropriate I/O circuits, thereby facilitating electrode programmability. The switch 226 is controlled by a control signal 228 from the microcontroller 220. Optionally, the switch 226 may be omitted and the I/O circuits directly connected to a housing electrode.

The IMD 100 is further equipped with a communication modem (modulator/demodulator) 240 to enable wireless communication. In one implementation, the communication modem 240 uses high frequency modulation, for example using RF, Bluetooth, or Bluetooth Low Energy telemetry protocols. The signals are transmitted in a high frequency range and will travel through the body tissue in fluids without stimulating the heart or being felt by the patient. In one example, the communication modem 240 can communicate data, information, signals, etc. that are utilized for obtaining feedback dependent data, information, signals, etc. for an AI algorithm. The communication modem 240 may be implemented in hardware as part of the microcontroller 220, or as software/firmware instructions programmed into and executed by the microcontroller 220. Alternatively, the modem 240 may reside separately from the microcontroller as a standalone component. The modem 240 facilitates data retrieval from a remote monitoring network. The modem 240 enables timely and accurate data transfer directly from the patient to an electronic device utilized by a physician.

The IMD 100 includes sensing circuit 244 selectively coupled to one or more electrodes that perform sensing operations through the switch 226 to detect CA signals indicative of cardiac activity. The sensing circuit 244 may include dedicated sense amplifiers, multiplexed amplifiers, or shared amplifiers. It may further employ one or more low power, precision amplifiers with programmable gain and/or automatic gain control, bandpass filtering, and threshold detection circuit to selectively sense the features of interest. In one embodiment, switch 226 may be used to determine the sensing polarity of the CA signal by selectively closing the appropriate switches.

In the example of FIG. 2, a single sensing circuit 244 is illustrated. Optionally, the IMD 100 may include multiple sensing circuits, similar to sensing circuit 244, where each sensing circuit is coupled to two or more electrodes and controlled by the microcontroller 220 to sense electrical activity detected at the corresponding two or more electrodes. The sensing circuit 244 may operate in a unipolar sensing configuration or a bipolar sensing configuration. Optionally, the sensing circuit 244 may be removed entirely, and the microcontroller 220 perform the operations described herein based upon the CA signals from the A/D data acquisition system 250 directly coupled to the electrodes.

To this end, the IMD 100 further includes an analog-to-digital A/D data acquisition system (DAS) 250 coupled to one or more electrodes via the switch 226 to sample CA signals across any pair of desired electrodes. The MDA process 237 may be applied to signals from the sensing circuit 244 and/or the DAS 250.

By way of example, the external device 254 may represent a bedside monitor installed in a patient's home and utilized to communicate with the IMD 100 while the patient is at home, in bed or asleep. The external device 254 may be a programmer used in the clinic to interrogate the IMD 100, retrieve data and program detection criteria and other features. The external device 254 may be a handheld device (e.g., smartphone, tablet device, laptop computer, smartwatch, and the like) that may be coupled over a network (e.g., the Internet) to a remote monitoring service, medical network and the like. The external device 254 may communicate with a telemetry circuit 264 of the IMD through a communication link 266. The external device 254 facilitates access by physicians to patient data as well as permitting the physician to review real-time CA signals while collected by the IMD 100. In one example, the telemetry circuit can communicate feedback dependent data, information, signals, etc. to the external device 254 for use by an AI algorithm.

The microcontroller 220 is coupled to a memory 260 by a suitable data/address bus 262. The memory 260 stores the motion data, baseline motion data sets, CA signals, as well as the markers and other data content associated with detection and determination of the arrhythmia.

The IMD 100 may further include one or more physiologic sensors 270. For example, the physiologic sensor 270 may represent one or more accelerometers, such as a three-dimensional (3D) accelerometer. The sensor 270 may utilize a piezoelectric, a piezoresistive, and/or capacitive components are commonly used to convert the mechanical motion of the 3D accelerometer into an electrical signal received by the microcontroller 220. By way of example, the 3-D accelerometer may generate three electrical signals indicative of motion in three corresponding directions, namely X, Y and Z directions. The electrical signals associated with each of the three directional components may be divided into different frequency components to obtain different types of information therefrom.

The physiologic sensor 270 collects device location information with respect to gravitational force while the IMD 100 collects CA signals in connection with multiple cardiac beats. The microcontroller 220 may utilize the signals from the physiologic sensor 270 in the manner described in U.S. Pat. No. 6,937,900, titled "AC/DC Multi-Axis Accelerometer for Determining A Patient Activity and Body Position," the complete subject matter which is expressly incorporated herein by reference. While shown as being included within the housing 102, the physiologic sensor(s) 270 may be external to the housing 102, yet still, be implanted within or carried by the patient.

The physiologic sensor 270 may be further configured to obtain motion data in the form of acceleration signatures generated during cardiac beats. The acceleration signatures from the sensor 270 are provided to the microcontroller 220 and are analyzed by the MDA process 237. The motion data is indicative of one or more of the patient posture.

In one example, the accelerator signatures may be an AC-high frequency component from the 3-D accelerometer. The AC-high frequency component may correspond to one or more axes of the accelerometer and, additionally or alternatively, may represent a composite AC-high frequency component formed from a combination (e.g., a sum) of the AC-high frequency components from the three electrical signals. The composite AC-high frequency component generally represents the acceleration signature that is indicative of motion data produced during a corresponding cardiac cycle due to one or more of the patient posture or the respiration cycle. The AC-high frequency component may include signals having a frequency of 10 KHz or more, and more preferably in the range of 10-100 kHz.

In yet another example, the three directional signals generated by the 3-D accelerometer may be passed through one or more bandpass filters 271 to separate the AC-high frequency component. The output of the bandpass filter 271, including primarily only AC-high frequency components, represents an acceleration signature indicative of motion data produced during a corresponding cardiac cycle due to one or more of the patient posture.

A battery 272 provides operating power to all of the components in the IMD 100. The battery 272 is capable of operating at low current drains for long periods of time. The battery 272 also desirably has a predictable discharge characteristic so that elective replacement time may be detected. As one example, the housing 102 employs lithium/silver vanadium oxide batteries. The battery 272 may afford various periods of longevity (e.g., three years or more of device monitoring). In alternate embodiments, the battery 272 could be rechargeable. See, for example, U.S. Pat. No. 7,294,108, titled "Cardiac event micro-recorder and method for implanting same", which is hereby incorporated by reference.

Figure 3:
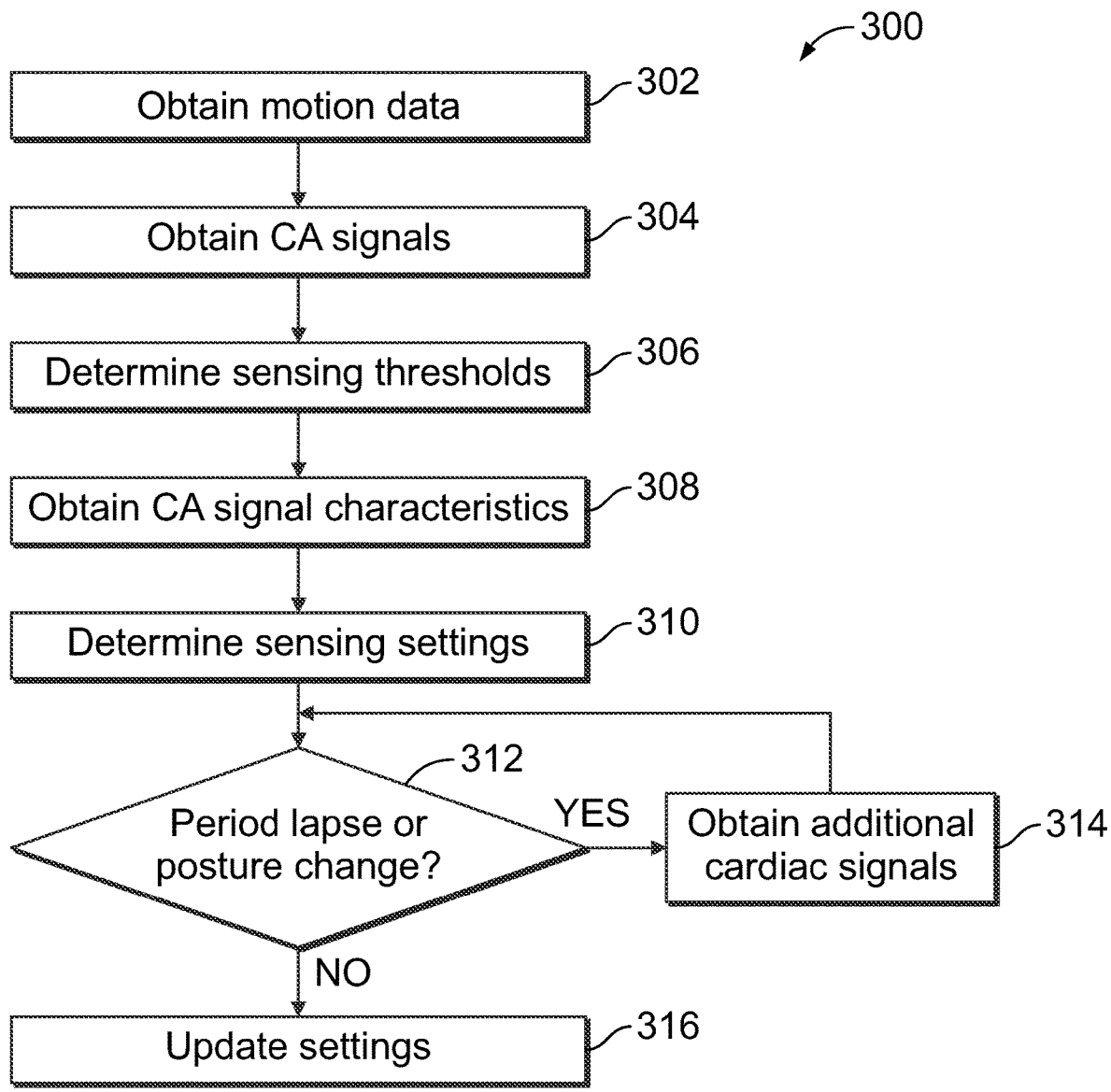
FIG. 3 illustrates a block flow diagram of a process for determining and updating the sense setting of an IMD in accordance with embodiments herein.

FIG. 3 illustrates a process 300 for determining and updating the sense setting of an IMD. In one example, the system and devices of FIGS. 1-2 are utilized to perform the method. In general, initially, during a first interval COIs of CA signals, motion data, position data, etc. are obtained during determined postures. In one example the first interval occurs during a physician visit, in a hospital, or the like. Such first interval can be measured in seconds, minutes, hours, etc. Based on the COIs of CA signals, motion data, position data, etc. settings are provided for an IMD such that when similar position data is detected by an accelerometer, or other position sensor, a determined posture is determined to be provided, and the corresponding setting is provided. Then, the one or more processors update the settings based on COIs of CA signals determined during a subsequent second interval. In example embodiments, to determine and update the sense settings, one or more processors utilize an algorithm, a learning algorithm, artificial intelligence, mathematical model, mathematical function, or the like.

At 302, one or more processors obtain motion data associated with a first posture of the patient during a first interval. In one example, a patient is observed at by a clinician. For example, during a visit to a physician, the patient may be intentionally placed in a first posture during the first interval to obtain motion data related to the first posture. Similarly, at the visit, the patient may be placed in a second posture, third posture, etc. to provide motion data for an accelerometer to utilize to determine a posture of the patient when the patient is not with a clinician. Optionally, an accelerometer of the IMD can be utilized to determine the posture of the patient. In another example, a three axis accelerometer is utilized. The first posture may be supine, sitting, standing, laying down, or the like. As used herein, term first interval relates to a period of time related to a particular posture, including postures associated with an activity level. In this manner, the first posture has a first interval, while a second posture also has a first interval, and a third posture has a first interval, etc.

At 304, the one or more processors obtain CA signals. The CA signals can be obtained from an IMD, such as the one presented in FIGS. 1-2. In one example, the IMD obtains an ECG to obtain the CA signals.

Figure 4:
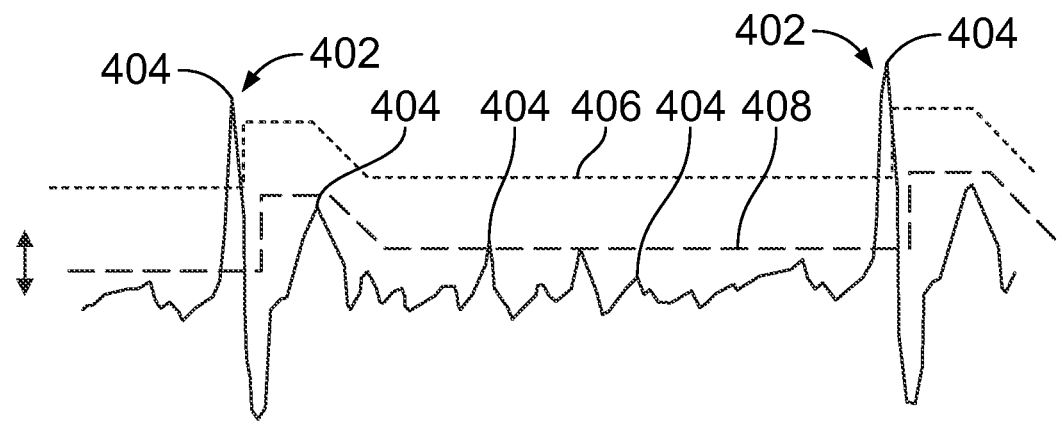
FIG. 4 illustrates graph of cardiac signals in accordance with embodiments herein.

At 306, the one or more processors determine sensing thresholds. FIG. 4 illustrates an example graph of the CA signals, such as ECG signals utilized to determine a primary threshold and a secondary threshold, or noise floor. Line 402 represents a cardiac signal 402, such as an ECG taken during a cardiac cycle of a patient. As illustrated, the cardiac signal 402 includes numerous local maximum detections 404 that represent local peaks of the cardiac signal that may be a result of the intrinsic heartbeat of the patient, or as a result of noise. As such, a primary threshold 406 amplitude for sending cardiac signals is established. The primary threshold 406 can vary over time, and increase in areas, such as where the R-wave or T-wave are expected, while decreasing in areas such as after the T-wave, but before a next R-wave. In particular, the primary threshold 406 is provided such that any amplitude detected above the primary threshold 406 is sent or transmitted as an R-wave for making determinations related to a posture. Meanwhile, a secondary threshold 408 is provided such as any local maximum detections 402 that are below the secondary threshold 408 are not transmitted. The secondary threshold 408 may be the same as the first threshold 406, or spaced high or lower from the first threshold 406 as illustrated as example. Similar to the first threshold 406, the secondary threshold 408 may increase or decrease based on the cardiac cycle interval, include whether an R-wave or T-wave are expected. In one example, slope of the primary threshold 406 and secondary threshold 408 are the same, or proportional to one another. In one example, when a local maximum detection 404 amplitude is above the secondary threshold 408, but below the secondary threshold, such signals are transmitted, sent, utilized, etc. as the T-wave.

Figure 5:
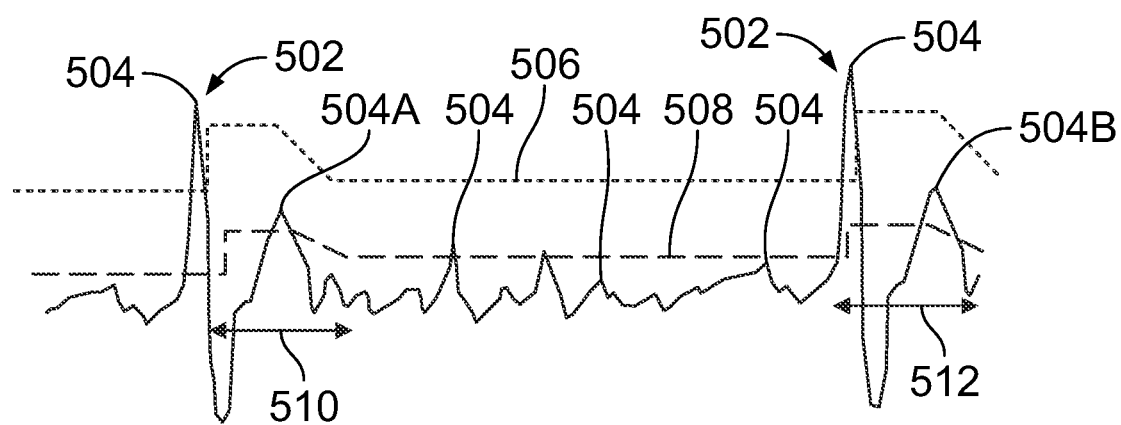
FIG. 5 illustrates graph of cardiac signals in accordance with embodiments herein.

In another example, the one or more processors determine amplitudes of a T-waves based on all cardiac signals above the secondary threshold, but below the first threshold. Again, such determinations can include determinations related to amplitude averages, minimums, maximums, standard deviations, distributions, or the like. FIG. 5 illustrates an example of how a T-wave can be detected. Similar to FIG. 4 a cardiac signal 502 is provided with numerous local maximum detections 504 provided. A primary threshold 506 is provided for sensing R-waves, while a secondary threshold is provided for sensing T-waves. The cardiac signal 502 illustrated includes a first detection window 510 and a second detection window 512 during which a T-wave is detected. In the first detection window 510 a first T-wave detection 504A is provided above the secondary threshold 508, while in the second detection window 512 a second T-wave detection 504B is provided above the secondary threshold 508. In each instance, a T-wave is detected.

With reference back to FIG. 3, at 308, the one or more processors obtain COI of CA signals and statistical indicators for the series of beats during the first interval that are related to the first posture. In one example, the one or more processors determine a COI that is an amplitude of R-wave signals. For example, the morphology of each cardiac signal is determined, including information such as the amplitude of the R-wave and T-wave. The amplitude of the R-wave may be determined through sensing, or other method for R-wave amplitude measurements. In particular, the amplitude of all cardiac signals detected above the first threshold are determined to be R-waves. A statistical indicator related to the R-waves can then be calculated. As examples, the amplitudes are averaged, standard deviations from an average, standard deviations from the first threshold, distributions, etc.

With reference back to FIG. 3, at 310 the one or more processors determine sensing settings. In particular, for a given posture data point of a first posture during a first interval, after sufficient data is collected as a result of a threshold number of cardiac cycles being reached, a statistical indicator such as the noise floor distribution is calculated. Optionally, the mean and standard deviation for each detection under the secondary threshold is also determined. In one example, the overall noise floor setting is set as:

$$T1 = n + \text{Factor}\_1 * \text{Dev}\_n,$$

Where the variable "n" represents the noise floor average, the Factor_1 represents an integer, that in one example is in a range between 1-5, and Dev_n represents the deviation of the posture data point from the noise floor average.

For a posture data point of the first posture in the first interval, after the threshold number of cardiac cycles is reached for sufficient data, the device in an example calculates another statistical indicator that is the R-wave distribution of the amplitudes, and obtains the mean and standard deviation for the amplitudes of the detected R-waves. In one example, the overall R-wave sensing setting is then set such as $$T2 = R - \text{factor}2 * \text{deviation } R$$

$$T3 = (T2) * \text{factor}3(1) - (T1) * \text{factor}3(2)$$

$$T = T3 + T1$$

Where R represents the R-wave amplitude average, factor 2 is an integer, that in one example can be in a range between 1-5, and deviation R represents the deviation of the R-wave from the R-wave amplitude average, factor 3(1) is a percent, and factor 3(2) is a percent. Alternatively, in another example:

$$T3 = (T2 - T1) * \text{factor}3$$

Where factor 3 is a percent.

Similarly, for a posture data point of the first posture, after the threshold number of cycles for sufficient data, the one or more processors can provide a statistical indicator by calculating the T-wave distribution of the amplitudes, and obtains the mean and standard deviation for each amplitude of each T-wave. In addition, a T-wave detection point relation to a corresponding R-wave detection point can also be determined. In one example, the T-wave sensing setting can be set such as:

$$\text{Threshold start} = Tt + \text{factor } 4 * \text{deviation } T \text{ wave}$$

$$\text{Decay delay} = t1 + \text{factor } 5(\text{factor can be } 0\text{-}5) * \text{deviation } T \text{ wave timing}$$

$$\text{Decay rate} = \text{down slope of the } T \text{ wave} + \text{factor } 6 * \text{deviation } T \text{ wave down slope}$$

Where Tt is the T-wave amplitude average, factor 4 is an integer that in one example is in a range between 0-5, deviation T-wave represents the deviation of the T-wave amplitude from the T-wave amplitude average, t1 represents T-wave timing, factor 5 is an integer that is in a range between 0-5, deviation T wave timing is the deviation of the T-wave timing from an average T-wave timing, factor 6 is an integer that is in a range between 0-5, and deviation T wave down slope is the deviation of the T-wave down slope from the average T-wave down slope.

For a posture data point of a first posture, after the threshold number of cycles for sufficient data is reached, and if the T-wave amplitude is too big, an additional band path filter can be added to reduce the T-wave, or a timing dependent filtering can be added to reduce the T-wave over the expected time window.

Then, based on the COI from the CA signals and calculated statistical indicators, sense settings such as gains, and dynamic range can also be determined so that the R-waves are between X percent (e.g. 50%) of the full range. In one example, the posture dependent settings for a first posture and a second posture during a first interval for both can be summarized as provided in table 1 below:

TABLE 1

| Data and settings | Posture 1 | Posture 2 |
|---|---|---|
| Noise floor related data | 0.005 +− 0.01 mV | 0.015 +− 0.01 mV |
| R wave related data | 0.5 +− 0.03 mV | 0.3 +− 0.02 mV |
| T wave related data | 0.1 +− 0.1 mV | 0.15 +− 0.1 mV |
| Primary sensing setting | 0.2 mV | 0.1 mV |
| Start threshold | 0.4 mV | 0.3 mV |
| Delay and decay | 100 ms | 150 ms |
| Gains and dynamic range | 1 mV | 0.8 mV |
| Filter selection | No change | Add high pass filter |

Figure 6A:
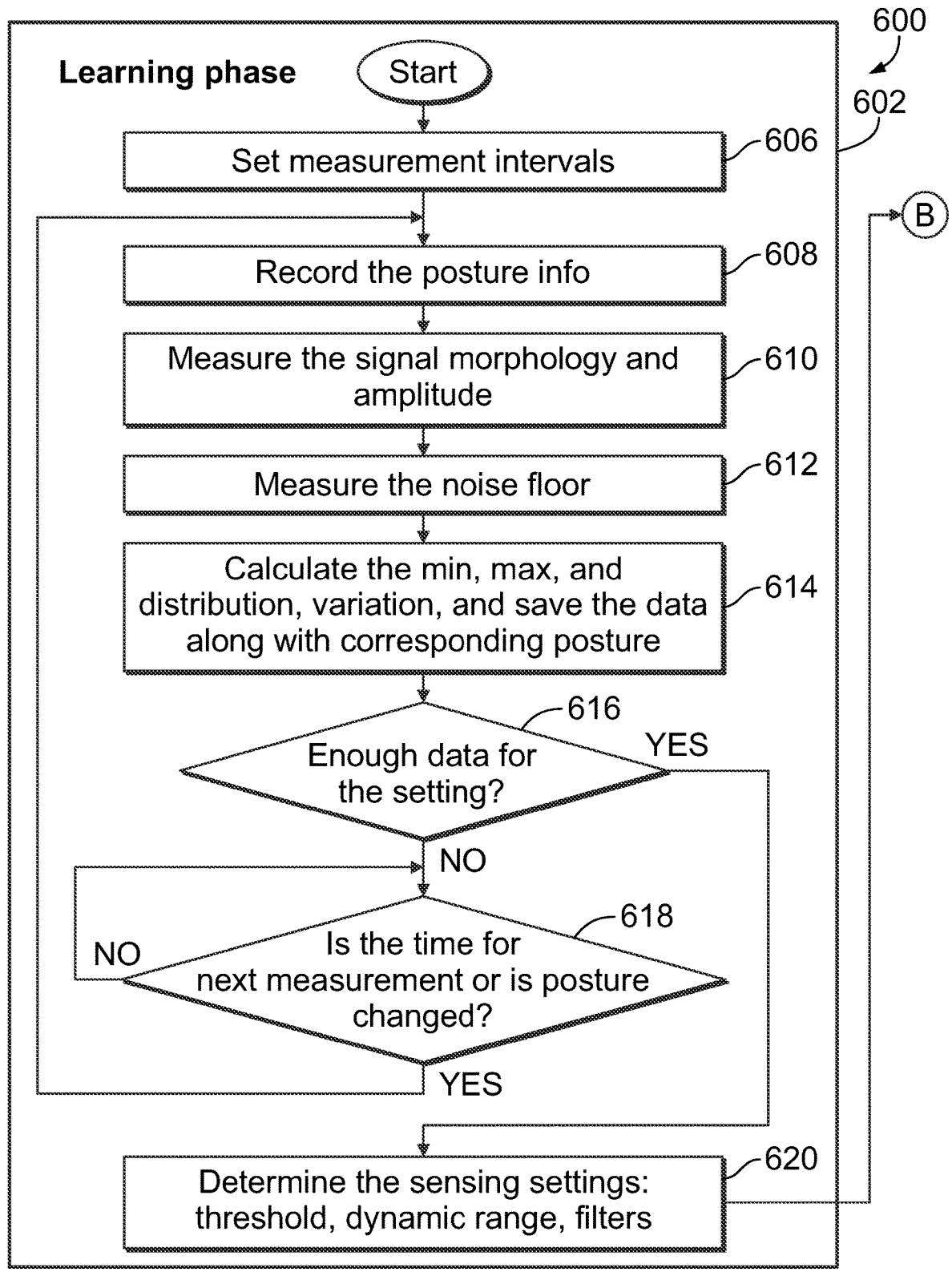
FIG. 6A illustrates a block flow diagram of a process for determining and updating the sense setting of an IMD in accordance with embodiments herein.

The process of steps 302-310 is generally referred to as the learning phase of the method provided. FIG. 6A illustrates the learning phase in even greater detail. While described in relation to just a first posture, the process of steps 302-310 can be repeated for a second posture, third posture, fourth posture, etc. In this manner, the obtained CA signals can relate to a first interval of a first posture, a first interval of a second posture, a first interval of a third posture, or the like. To the end, the COI of CA signals can relate a first posture, second posture, third posture, etc.

With reference back to FIG. 3, at 312 the one or more processors determine if a period (e.g. minutes, hours, etc.) has lapsed, or if a posture change to a second posture has been identified. If the time has not lapsed, or if the one or more processors do not identify a change from the first posture to a second posture, the one or more processors continue using the determined settings, and continues to be within the learning phase.

If at 312 the one or more processors determine the period has lapsed, or a posture has changed to a second posture, at 314, the one or more processors obtain additional cardiac signals to determine the R-wave amplitudes and T-wave amplitudes. In particular, the R-wave amplitudes and T-wave amplitudes can be utilized to update the settings. This part of the process, including steps 314-316 are referred to as the operating an adjusting phase. The adjusting phase typically occurs after a patient leaves a physician facility. The operating and adjusting phase is illustrated in additional detail in relation to FIG. 6B.

At 316, the one or more processors update the settings. In particular, based on the new cardiac signals obtained, the amplitude minimum, maximum, average, median, distribution, deviations, etc. can all be updated, along with the noise floor. Based on these updates, the optimal setting for corresponding postures may similarly be updated. In this manner, the settings update in real time based on information learned during operation instead of through a calibration process. As a result, more accurate sensing is accomplished, preventing the detection of false AFs, or other signals.

Figure 6B:
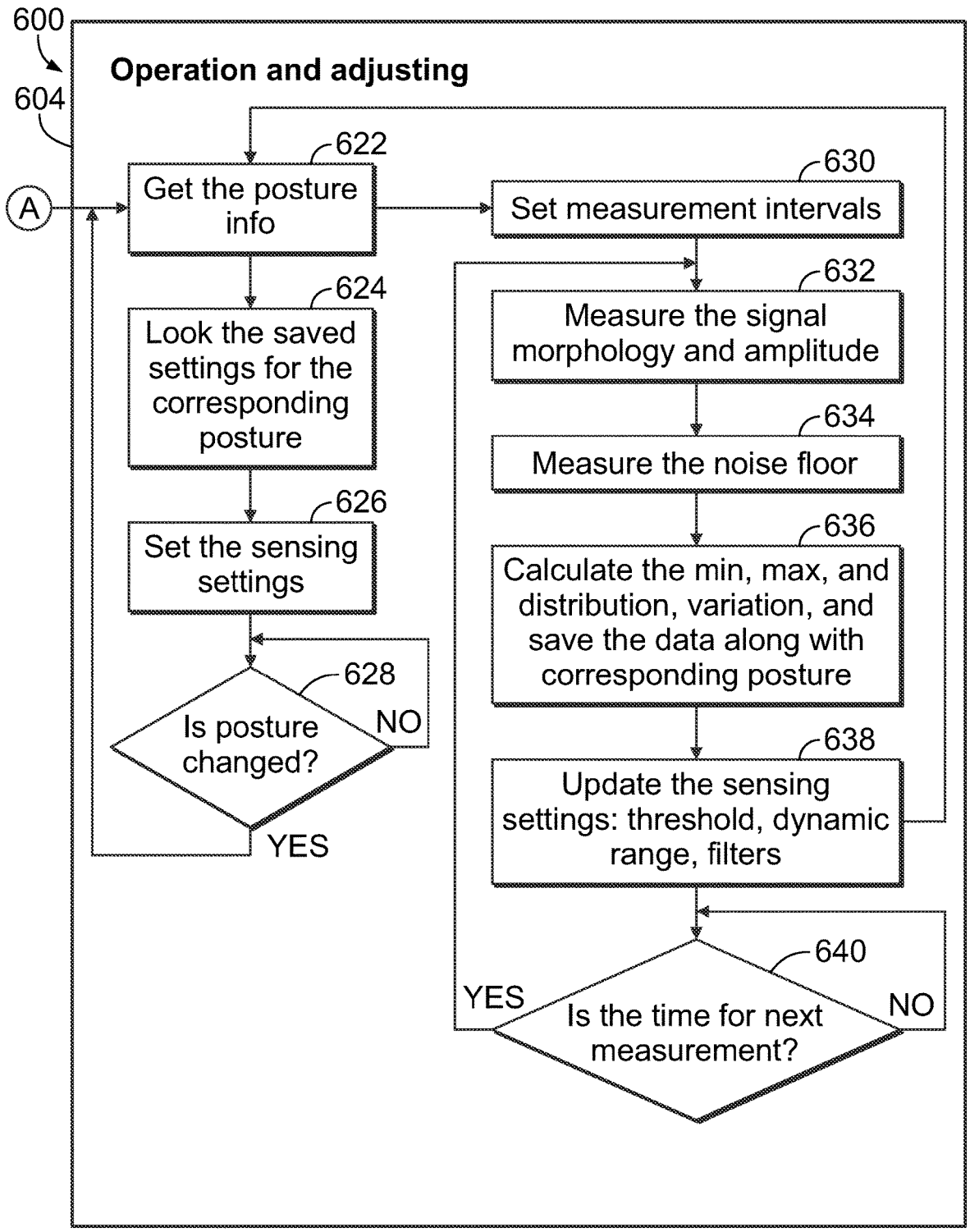
FIG. 6B illustrates a block flow diagram of a process for determining and updating the sense setting of an IMD in accordance with embodiments herein.

FIGS. 6A-6B illustrate in greater detail, a process 600 for determining and updating the sense setting of an IMD. In one example, the IMD is the IMD as described in relation to FIGS. 1-2. The process includes a self-learning phase process 602 where a sense setting is determined for numerous postures during a first interval, and an adjusting phase process 604 that occurs subsequently during a second interval to update the sensor settings and is dependent on the posture of the user. During both the self-learning phase and adjusting phase, one or more processors utilizing algorithms, self-learning algorithms, artificial intelligence, mathematical models, mathematical functions, etc. are utilized in determining and updating the sense setting of the IMD.

With reference to FIG. 6A, the one or more processors at 606 provide an initial sensing setting for an IMD. The initial sensing setting may be a default setting that is provided by a manufacturer, manually inputted by a physician, or the like that is not based on the specific user of the IMD. In one example, the initial sensing setting is based on an average population of users of the IMD, and can even provide more specific setting based on use body mass index (BMI), age, health characteristics such as being a smoker, having a medical condition, etc.

At 608, the one or more processors record posture information for a first posture data point. The posture information may be manually inputted into the IMD and stored in a memory. The posture information can include the specific posture of the user, including supine, laying on a right side, laying on a left side, sitting, standing, position based on an activity level such as isometric arm exercises (e.g., pushing, pulling, and the like), ballottement, chest thump, device pressure (e.g., top, mid, and base), arm flap, hand shake, and the like. In addition, the posture information can include information determined based on signals received from a physiological sensor such as an accelerometer, 3-D accelerometer, etc. In particular, in one example, during a visit to a clinician, or when an IMD is first implanted, numerous different postures can be provided and recorded such that the physiological sensor can be utilized during use outside the clinician environment to determine the posture of the patient.

At 610, the one or more processors measure the morphology of a CA signal of a series of beats. In one example, the cardiac signal is received from an ECG that is sensed by the IMD. The cardiac signal includes an R-wave, T-wave, QRS interval, etc. The morphology of the CA signals includes amplitudes, intervals, including intervals for R-waves, and T-waves, widths or timing of intervals, or the like. Again, the morphology is determined, and associated with each individual posture as determined during the first interval. In addition, when measuring the morphology, a primary threshold can be determined that is related to the R-waves. Optionally, statistical indicators related to the morphology can be calculated for each beat in the series of beats. For example, each beat in the series of beats can be analyzed for each R-wave with the understanding that the R-wave has the largest amplitude for each CA signal. For example, averaging, deviations, distributions, maximums, minimums, etc. for the amplitudes of the R-waves can be calculated or determined and a primary threshold provided such that any amplitude exceeding or greater than the primary threshold is considered an R-wave. In this manner, the one or more processors can identify an R-wave during use subsequent to the first interval during second, third, fourth, etc. intervals.

At 612, the one or more processors determine a secondary threshold, or noise floor. In particular for each CA signal, local maximums or peaks are formed as part of the morphology of the signal. However, often these peaks are as a result of noise in the environment, not because of the intrinsic beat of the heart. The peaks, or noise, typically have reduced amplitudes compared to the amplitudes of the R-wave and T-wave. As a result, based on determining the minimum, maximum, deviation, distribution, average, etc. of all of the peaks, a secondary threshold can be determined that represent a line, local maximum, or local peak, sensed that falls below the secondary threshold is merely considered environmental and not utilized for calculations and determinations related to the morphology of the CA signals.

In addition, the secondary threshold, or noise floor, can be utilized in association to the primary threshold to identify T-waves. In particular, the amplitudes that are above the secondary threshold, yet below the primary threshold are identified as T-wave amplitudes. To this end, T-wave intervals may be utilized based on timing from a detected R-wave to ensure the sensed amplitude is the T-wave.

In an example, every local peak amplitude over a series of beats is obtained. In one example, a first local peak is at 2.8 mV, a second local peak is at 0.1 mV, as third local peak at 0.2 mV, a fourth local peak at 0.7 mV, a fifth local peak at 0.1 mV, a sixth local peak at 2.6 mV, a seventh local peak at 0.2 mV, an eight local peak at 0.1 mV, a ninth local peak at 0.9 mV, and a tenth local peak at 0.1 mV. Specifically, two heart beats are provided wherein the 2.8 mV and 2.6 mV peaks are the amplitudes of R-waves, while the 0.7 mV and 0.9 mV peaks are amplitudes of T-waves, while all other local peaks represent noise. From these local peaks a statistical indicator of a 0.78 mV average can be calculated. Similarly, the deviation of the 2.6 mV and 2.8 mV measure can be utilized to provide a primary, or first threshold. In one example a set deviation, such as 1 mV from the average can be utilized to provide a first threshold that is 1.78 mV such that any amplitude above 1.78 mV is considered an R-wave amplitude. In another example, all local peaks above this first threshold can be discarded for the purposes of determining the second threshold, where the 8 measurements of 0.9 mV and lower are utilized to average, calculate deviations, etc. to determine the second threshold.

At 614, the one or more processors determine and record the COI of CA signals and statistical indicators. As indicated above, for each CA signal, and in particular, each beat of a cardiac signal, COIs of CA signals such as amplitude of R-waves, and T-waves are determined and recorded. For example, after determining the primary threshold, and secondary threshold, the R-waves, T-waves, T-wave intervals, QRS intervals, etc. can be determined. The COIs of CA signals can not only be obtained, or determined, but in addition, can be utilized to update the primary threshold and secondary threshold for subsequent beats, along with determining statistical indicators related to the CA signals. The statistical indicators can include amplitude minimums, maximums, averages, distribution, variation, deviation, etc. In this manner, both COIs of CA signals, and statistical indicators are determined for different postures during a first interval and are recorded for use with subsequent intervals.

At 616, the one or more processors determine if a threshold amount of CA signals have been analyzed to provide a sense setting. In particular, in some examples, a number of beats must be reached before the sensing setting is provided to be utilized in subsequent intervals. In another example, the threshold amount of CA signals is dynamic based on statistical indicators such as deviation, distributions, etc. In particular, if there is little noise, and the R-wave and T-wave amplitudes are consistent, a reduced number of amplitudes need to be analyzed before providing the first threshold and second threshold for the sense setting. Alternative a set number of beats must be obtained regardless of COI of CA signals. In yet another example, a clinician reviews the COI of CA signals to determine when the threshold amount of CA signals analyzed has been reached.

If at 616, the one or more processors determine a threshold number of CA signals has not been reached, no sense setting is provided, and at 618, the one or more processors make a determination if a determined time period has passed for taking additional measurement, or if the posture of the user has changed. In particular, each individual posture has its own data set and analysis, such that is the posture of a user has changed, the data being obtained, and recorded must be associated with the new, or second posture, instead of a first posture. Regarding the determined time period, the determined time period can be a number of seconds, minutes, etc. or relate to a patient activity, movement, posture, changing posture, or the like, that ensures, the one or more processors continuously obtain CA signals for analysis in real time. In an example, the determined time period is between one (1) minute and fifteen minutes (15). Whether as a result of more information needed, or a second posture, the one or more processors again go through and obtain the morphology data and information and determine COI of CA signals to provide sensed setting during the first interval.

If at 616, the one or more processors determine a threshold number of CA signals has been reached, then at 620, the one or more processors provide a first sense setting. The first sense setting includes the primary threshold, the secondary threshold, dynamic range, filters, etc. In particular, the sense setting is provided so that after the first interval, the one or more processors can continue to monitor the CA signal, update the COI from the CA signals and statistical indicators, and the sense setting to improve analysis and prevent under-sensing and oversensing.

In one example, the COIs of the CA signals are the amplitude of each R-wave. In an example, an amplitude of a first R-wave from a first beat can be 0.2 milli Volts (mV), an amplitude of a second R-wave from a second beat can be 0.6 mV, a third amplitude of a third R-wave 0.5 mV, a fourth amplitude from a fourth R-wave 0.5 mV, and a fifth amplitude from a fifth R-wave 0.2 mV. To provide a statistical indicator the five amplitudes may be averaged showing that the average R-wave amplitude is 0.4 mV. In addition, other statistical indicators can be provided including the range that is calculated as 0.5 mV, and the deviation from each individual R-wave that can be as much as 0.3 mV and as little as 0.1 mV. In this manner, in one example, five COIs can be a threshold number of COIs for providing the COIs and statistical indicators desired to provide a first sense setting. Therefore, when only three COIs are measured, or detected, the one or more processors obtain additional R-wave amplitudes from subsequent beats until the threshold is met.

In another example, the COIs include the morphology of the R-wave based on a measured slope of a portion of the R-wave. In one example, the downward slope subsequent to the peak (R) and before the valley (S) of the QRS interval is measured. In one embodiment, the threshold is a −0.03 measurement, and a first slope of a first R-wave can be −0.02, a second slope of a second R-wave −0.025, and a third slope of a third R-wave can be −0.03. From these measurements, a statistical indicator of a −0.025 slope average, a 0.01 range, a 0.005 deviation, etc. can be calculated. Then, based on the COIs and calculated statistical indicators, the first sense setting is provided.

In each example, once an initial threshold number of readings is presented, a first sense setting can be provided. This first sense setting can then be utilized at a later time when a similar posture is determined by the one or more processors.

With reference to FIG. 6B, after a sense setting is provided for each posture, the updating of the sense settings is provided. In this manner, the determinations, calculations, analysis, etc. with relation to FIG. 6A relates to a first interval when the sense settings are being determined based on the morphology of the CA signals detected. Meanwhile, FIG. 6B represents subsequent intervals to the first interval, including a second interval, third interval, etc. where the COI of CA signals obtained are utilized in combination with the COI of CA signals obtained during the first interval to continuously update the sense setting in real time. The operation and adjusting may be provided utilizing algorithms, self-learning algorithms, artificial intelligence, mathematical models, mathematical functions, etc.

At 622, the one or more processors obtain posture information during a second interval. In particular, after providing the sense setting, the posture of the user is continuously monitored. Additionally, the physiological sensor, such as an accelerometer, continues to receive signals to receive position data and motion data that can be compared to the position data and motion data obtained during the first interval. Based on this comparison, the posture of the user can be determined, including a determination regarding whether the posture of the user has changed from the last time the information was obtained.

To this end, at 624, the one or more processors compare the position data and motion data obtained during the first interval to position data and motion data obtained during the second (subsequent) interval. Based on the comparison, a determination is made regarding the posture of the user. The determination can be made by utilizing a lookup table, decision tree, mathematical model, algorithm, mathematical functions, etc.

At 626, the one or more processors set the sense setting based on the posture that is determined to be presented. Based on the posture detected and determined utilizing the physiological sensor, the corresponding sense setting for the posture are provided.

At 628, a determination is made whether the posture determined is changed from a previous posture. If the posture has changed, the posture information continues to be obtained. In this manner, the sense settings are always provided based on the determined posture of the patient during the second interval.

In addition to determining the posture in order to change the sense setting as needed to ensure correct operation of the IMD, after the posture information is obtained at 622, at 630, the one or more processors set measurement intervals. The measurement intervals are determined time periods utilized to continuously update the sense setting in real time. To this end, the determined time periods may be provided in seconds, minutes, hours, days, etc. depending on battery usage requirements, and desired improvements to sensing accuracy. In one example, the determined time period is between 1 and 15 minutes. The determined periods may be static, or constant and always be the same amount of time, or alternatively may be dynamic. In particular, if a determined event occurs, such as a detected AF, a reduction in the time period may be provided to ensure additional accuracy during a period when the AF is detected to ensure a false AF has not been recorded. In one example, additional data points may be provided for a physician by reducing the determined time periods. In another example, the sensing of a new posture may result in the shortening of a determined time period, or for CA signals to automatically be obtained for analysis.

At 632, the one or more processors measure the morphology of a CA signal of a series of beats. In one example, the one or more processors measure the morphology as provided at 610. For example, the morphology of the CA signals includes amplitudes, intervals, including intervals for R-waves, and T-waves, widths or timing of intervals, or the like. The morphology of the CA signals is determined during the subsequent, second interval for use with the previously obtained morphology data obtained during the first interval.

At 634, the one or more processors measure, and determine the noise floor. Again, based on the previously obtained morphology data from the first interval, the morphology data for the second interval is utilized to update the morphology data and corresponding statistical indicator of the COI signals. This includes updating the primary threshold, and secondary threshold, or noise floor, based on the most recently received statistical indicators of the COI. In one example, the statistical indicator of the COI can be averaged previously recorded statistical indicators to determine the updated sense setting. In another example, the obtained statistical indicator of the COI for the second interval are utilized in a first in first out (FIFO) determination, with a determined number of amplitudes utilized for determining the first threshold and second threshold, such that amplitudes obtained during the first intervals are not utilized in determining the sensing settings. To this end, eventually after enough subsequent intervals, the sense setting is determined based only on a statistical indicator of the COI determined after the first interval. In this manner, memory storage space, battery, etc. are saved during determinations.

At 636, the one or more processors determine and record the COIs of CA signals, and statistical indicators. As indicated above, for each CA signal, and in particular, each beat of a cardiac signal, COI from the CA signals such as amplitude of R-waves, and T-waves are determined and recorded. Optionally, after determining the primary threshold, and secondary threshold, the R-waves, T-waves, T-wave intervals, QRS intervals, etc. can be determined. Such COIs of CA signals can not only be obtained, or determined, but in addition, can be utilized to update the primary threshold and secondary threshold for subsequent beats, and determine the statistical indicators. Such statistical indicators can include amplitude minimums, maximums, averages, distribution, variation, deviation, etc. In this manner, the statistical indicators are determined for different postures during a first interval and are recorded for use with subsequent intervals.

In the example described in relation to step 616, an amplitude of a first R-wave from a first beat can be 0.7 milli Volts (mV), an amplitude of a second R-wave from a second beat can be 0.3 mV, a third amplitude of a third R-wave 0.5 mV, a fourth amplitude from a fourth R-wave 0.4 mV, and a fifth amplitude from a fifth R-wave 0.6 mV. To provide a statistical indicator the five amplitudes may be averaged showing that the average R-wave amplitude is 0.5 mV. In addition, other statistical indicators can be provided including the range that is calculated as 0.4 mV, and the deviation from each individual R-wave that can be as much as 0.2 mV and as little as 0 mV. In this manner, the first sense setting is based on these ten R-wave amplitudes. During a later time, or second interval, a five additional R-wave amplitudes may be obtained. In one example, the ten additional R-wave amplitudes are averaged with the original ten R-wave amplitudes to provide an average R-wave amplitude of 0.55, a range of 0.6 mV, along with addition deviation and distribution calculations of each recorded R-wave amplitude. Then, based on the updated R-wave amplitude average a second sense setting can be provided.

In another example, as indicated in the example provided at step 616, the COIs include the morphology of the R-wave based on a measured slope of a portion of the R-wave. In the example, the downward slope subsequent to the peak (R) and before the valley (S) of the QRS interval is measured. In one embodiment, the threshold is 3 measurement, and a first slope of a first R-wave can be −0.03, a second slope of a second R-wave −0.025, and a third slope of a third R-wave can be −0.0275. From these measurements, a statistical indicator of a −0.0275 slope average, a 0.05 range, a 0.025 deviation, etc. can be calculated. Then, based on the COIs and calculated statistical indicators, the first sense setting is provided. At this time (step 636), in the example, an extra two slope measurements may be obtained causing the average slope to increase to a −0.0255 slope average and having a range of 0.01, and updated deviations and distributions. These statistical indicators are thus updated, and a second sense setting is provided related to these updated statistical indicators.

At 638, the one or more processors update the first sense setting for the corresponding posture. The subsequent sense settings include the primary threshold, the secondary threshold, dynamic range, filters, etc. In particular, the sense settings are provided so that during a second interval, and other subsequent intervals, the one or more processors can continue to monitor the CA signals and update COIs of CA signals and statistical indicators, and the sense settings to improve analysis and prevent undersensing and oversensing. In this manner, the one or more processors dynamically update the sense settings continuously in real time after the first interval that typically occurs under the direction of a clinician.

In one example, the sense setting is a gain that is determined based on the average of the amplitudes of the R-wave. In the example, the first sense setting presents a gain of 1 mv as a result of the R-wave amplitudes having an average of 0.8 mV. After this first setting is applied, R-wave amplitudes continue to be measured. If after another ten beats, the R-wave amplitude drops to 0.5 mV, the first sense setting may be updated, or changed to present a second sense setting that is a gain of 0.3 mV to reflect the most recently obtained COIs and calculated statistical indicator.

In another example, the sense setting is the second threshold, or noise floor. In this example after an initial ten local peaks are obtained, the average mV for all peaks can be 0.78 mV, resulting in a second threshold of 0.3 mV. After another twenty local peaks are obtained, the average mV for all third peaks, or even the most recent twenty peaks can be 0.68 mV, resulting in the second threshold to be reduced to 0.23 mV as a second sense setting for the noise floor.

In yet another example, the first sense setting can be a decay or delay setting. Such a setting can depend on the COI of the slop of the T-wave. In one example, a statistical indicator is provided for the average slope of five different T-waves to be −2.5 at a first sense setting. Based on this slope, the decay or delay can be provided at 100 ms. Then after an additional three reading, the average slop of the eight T-waves can be −2.8 resulting in a second sense setting of 120 ms.

At 640, the one or more processors determine if a defined interval has lapsed, or if determined feedback is provided. In one example a time dependent determination is made where upon the defined interval lapsing a subsequent interval begins where CA signals are obtained, recorded, and analyzed for determined updated COI of CA signals and statistical indicators. Alternatively, a feedback dependent determination is made where and event, such as the detection of an impedance level, a determined slope, medication level detection, a user feedback related data or information, etc. indicates updating is required. The updated COI of CA signals and statistical indicators are then utilized to again update the sense settings to improve analysis and prevent undersensing and/or oversensing of intrinsic events.

CLOSING

It should be clearly understood that the various arrangements and processes broadly described and illustrated with respect to the Figures, and/or one or more individual components or elements of the arrangements and/or one or more process operations associated of the processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

As will be appreciated by one skilled in the art, various aspects may be embodied as a system, method, or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices, and program products according to various example embodiments. The program instructions may be provided to a processor of a general-purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally, or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A computer implemented method, comprising:
   under control of one or more processors of an implantable medical device (IMD), where the one or more processors are configured with specific executable instructions to:
   obtain motion data indicative of a first posture;
   determine a first sense setting for cardiac activity (CA) signals sensed by at least one electrode of the IMD based on the first posture;
   obtain, with the at least one electrode, CA signals for a series of beats while applying the first sense setting;
   obtain a characteristic of interest (COI) from the CA signals for the series of beats;
   periodically obtain additional cardiac signals;
   in response to obtaining the additional cardiac signals, calculate with a self-learning algorithm, on a time dependent basis that includes a determined time period, a statistical indicator at the first posture from the COI over the series of beats based on the COI from the additional CA signals;
   derive and implement a second sense setting for the additional CA signals sensed by the at least one electrode based on the first sense setting and the statistical indicator of the COI.

2. The method of claim 1, wherein to obtain the COI from the CA signal for the series of beats includes:
   determining a first threshold and a second threshold; and
   measuring morphology and amplitude of the CA signals based on the first threshold and second threshold.

3. The method of claim 2, wherein the method further includes identifying R-waves based on the first amplitude threshold, and identifying T-waves based on the second amplitude threshold.

4. The method of claim 1, wherein to obtain the statistical indicator of the COI includes calculating at least one of an amplitude minimum, an amplitude maximum, a distribution of amplitudes, or a deviation related to an amplitude.

5. The method of claim 1, wherein the first sense setting is at least one of gain, dynamic range, threshold, or filtering.

6. The method of claim 1, wherein to determine the first sense setting of the IMD based on the first posture includes determining if a threshold amount of series of beats has occurred, and determining the first sense setting based on the COI from the CA signals or the statistical indicator responsive to reaching the threshold amount.

7. The method of claim 1, wherein the one or more processors obtain the additional CA signals for the series of beats while applying the first sense setting responsive to a first event.

8. The method of claim 7, wherein the first event is one of a determined time period or a detection of a change in posture.

9. The method of claim 1, wherein to determine a first sense setting includes:
  obtaining cardiac activity (CA) signals for a series of beats before applying the first sense setting;
  obtaining a characteristic of interest (COI) from the CA signals for the series of beats obtained before applying the first setting;
  calculating a statistical indicator of the series of beats obtained before applying the first setting based on the COI from the CA signals; and
  determining the first setting based on the statistical indicator of the series of beats obtained before applying the first setting.

10. A system, comprising:
  one or more processors; and
  a memory coupled to the one or more processors, wherein the memory stores program instructions, wherein the program instructions are executable by the one or more processors to:
  obtain motion data indicative of a first posture in response to a posture change;
  determine a first sense setting for cardiac activity (CA) signals sensed by at least one electrode of the IMD based on the first posture;
  obtain, with the at least one electrode, CA signals for a series of beats while applying the first sense setting;
  obtain a characteristic of interest (COI) from the CA signals for the series of beats;
  periodically obtain additional cardiac signals;
  in response to obtaining the additional CA signals, calculate with a self-learning algorithm a statistical indicator from the COI over the series of beats based on the COI from the CA signals; and
  derive and implement a second sense setting for the CA signals sensed by the at least one electrode based on the first sense setting and the statistical indicator of the COI.

11. The system of claim 10, wherein to obtain the COI from the CA signal for the series of beats includes:
  determining a first threshold and a second threshold; and
  measuring morphology and amplitude of the CA signals based on the first threshold and second threshold.

12. The system of claim 11, wherein the one or more processors are configured to identify R-waves based on the first amplitude threshold, and identify T-waves based on the second amplitude threshold.

13. The system of claim 10, wherein to obtain the statistical indicator of the COI includes calculating at least one of an amplitude minimum, an amplitude maximum, a distribution of amplitudes, or a deviation related to an amplitude.

14. The system of claim 10, wherein the first sense setting is at least one of gain, dynamic range, threshold, or filtering.

15. The system of claim 10, wherein to determine the first sense setting of the IMD based on the first posture includes determining if a threshold amount of series of beats has occurred, and determining the first sense setting based on the COI from the CA signals or the statistical indicator responsive to reaching the threshold amount.

16. The system of claim 10, wherein the one or more processors obtain the CA signals for the series of beats while applying the first sense setting responsive to a first event.

17. A system, comprising:
  one or more processors; and
  a memory coupled to the one or more processors, wherein the memory stores program instructions, wherein the program instructions are executable by the one or more processors to:
  obtain motion data indicative of a first posture;
  determine a first sense setting for cardiac activity (CA) signals sensed by at least one electrode of the IMD based on the first posture;
  obtain motion data indicative of a second posture;
  determine a first sense setting of for the CA signals sensed by the at least one electrode of the IMD based on the second posture;
  obtain CA signals for a series of beats while applying the first sense setting of the first posture;
  obtain a characteristic of interest (COI) from the CA signals for the series of beats obtained while applying the first sense setting of the first posture;
  periodically obtain additional CA signals;
  in response to obtaining the additional CA signals, calculate with a self-learning algorithm, on a time dependent basis that includes a determined time period, a statistical indicator from the COI over the series of beats obtained while applying the first sense setting of the first posture based on the COI from the CA signals;
  derive a second sense setting for the additional CA signals sensed by the at least one electrode for the first posture based on the first sense setting and the statistical indicator of the COI obtained while applying the first sense setting of the first posture;
  detect a change in posture from the first posture to the second posture;
  responsive to the change in posture from the first posture to the second posture applying the first sense setting for the second posture; and
  update the first sense setting for the CA signals sensed by the at least one electrode of the IMD based on the first posture to the second sense setting for the first posture in real time.

18. The system of claim 17, wherein the program instructions are executable by the one or more processors to:
  obtain the additional cardiac activity (CA) signals for a series of beats while applying the first sense setting of the second posture;
  obtain a characteristic of interest (COI) from the additional CA signals for the series of beats obtained while applying the first sense setting of the second posture;
  calculate a statistical indicator from the COI over the series of beats based on the COI from the additional CA signals obtained while applying the first sense setting of the second posture; and
  derive a second sense setting for the second posture based on the first sense setting and the statistical indicator of the COI obtained while applying the first sense setting of the second posture.

19. The system of claim 17, wherein to obtain the COI from the CA signals for the series of beats obtained while applying the first sense setting of the first posture includes:
  determining a first threshold and a second threshold; and
  measuring morphology and amplitude of the CA signals for the series of beats obtained while applying the first sense setting of the first posture based on the first threshold and second threshold.

20. The system of claim 19, wherein the one or more processors are configured to identify R-waves based on the first amplitude threshold, and identify T-waves based on the second amplitude threshold.

* * * * *